United States Patent
Park et al.

(10) Patent No.: US 10,091,431 B2
(45) Date of Patent: Oct. 2, 2018

(54) METHOD AND APPARATUS FOR CONTROLLING SYNCHRONIZATION OF CAMERA SHUTTERS IN IN-VEHICLE ETHERNET COMMUNICATION NETWORK

(71) Applicants: HYUNDAI MOTOR CORPORATION, Seoul (KR); HYUNDAI MOBIS CO., LTD., Seoul (KR)

(72) Inventors: Seong Jin Park, Daejeon (KR); Seung Su Kim, Seoul (KR); Woo Sub Kim, Namyangju-si (KR); Ki Gon Park, Seongnam-si (KR)

(73) Assignees: HYUNDAI MOTOR COMPANY, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/712,869

(22) Filed: May 14, 2015

(65) Prior Publication Data
US 2016/0212307 A1 Jul. 21, 2016

(30) Foreign Application Priority Data
Jan. 20, 2015 (KR) .................. 10-2015-0009401

(51) Int. Cl.
*H04N 5/232* (2006.01)
*H04N 5/235* (2006.01)

(52) U.S. Cl.
CPC ....... *H04N 5/2353* (2013.01); *H04N 5/23206* (2013.01)

(58) Field of Classification Search
CPC ....... H04L 12/28; H04L 67/12; H04L 65/102; H04L 12/413; H04N 5/2306
See application file for complete search history.

(56) References Cited

U.S. PATENT DOCUMENTS 4,107,704 A * 8/1978 Iwata .................. G03B 7/093
396/245
6,670,933 B1 * 12/2003 Yamazaki ............ G06F 3/1454
340/4.62

(Continued)

FOREIGN PATENT DOCUMENTS

| JP | H08-65576 A | 3/1996 |
| JP | 2007-243273 A | 9/2007 |

(Continued)

*Primary Examiner* — Jefferey F Harold
*Assistant Examiner* — Humam M Satti
(74) *Attorney, Agent, or Firm* — McDermott Will & Emery LLP

(57) ABSTRACT

The present invention relates to a method and apparatus for controlling synchronization of camera shutters in an in-vehicle Ethernet communication network. A method for controlling synchronization of a camera shutter by a camera controller cooperating with a grandmaster through Ethernet communication may include performing a time synchronization procedure with the grandmaster, reducing a preset pulses per second (PPS) down counter if the time synchronization procedure is successfully completed, and operating the camera shutter when the PPS down counter reaches 0. Accordingly, the present invention may provide accurate image frames of a desired time through synchronization of shutters of cameras connected to an in-vehicle Ethernet network.

8 Claims, 6 Drawing Sheets

(56) References Cited

U.S. PATENT DOCUMENTS

| | | | | |
|---|---|---|---|---|
| 7,330,644 B1* | 2/2008 | Nemoto | | G11B 19/02 |
| | | | | 348/207.99 |
| 7,340,767 B2* | 3/2008 | Kikuchi | | H04N 5/23206 |
| | | | | 348/216.1 |
| 7,511,764 B2* | 3/2009 | Cooper | | H04N 5/073 |
| | | | | 348/512 |
| 9,544,492 B2* | 1/2017 | Zhang | | H04N 5/23206 |
| 9,998,648 B2* | 6/2018 | Ito | | G08C 17/02 |
| 2003/0133018 A1* | 7/2003 | Ziemkowski | | H04N 5/2256 |
| | | | | 348/211.2 |
| 2004/0017486 A1* | 1/2004 | Cooper | | H04N 5/073 |
| | | | | 348/211.1 |
| 2005/0280702 A1* | 12/2005 | Nakano | | H04N 13/239 |
| | | | | 348/42 |
| 2006/0164424 A1* | 7/2006 | Wiley | | G09G 5/393 |
| | | | | 345/539 |
| 2007/0223069 A1* | 9/2007 | Ota | | H04N 5/165 |
| | | | | 358/529 |
| 2009/0079844 A1* | 3/2009 | Suzuki | | G03B 13/36 |
| | | | | 348/222.1 |
| 2009/0251601 A1* | 10/2009 | Ihlefeld | | H04N 5/0733 |
| | | | | 348/521 |
| 2010/0149325 A1* | 6/2010 | Fujiki | | G02B 21/367 |
| | | | | 348/79 |
| 2012/0131130 A1* | 5/2012 | Field | | H04L 12/4035 |
| | | | | 709/217 |
| 2013/0342333 A1* | 12/2013 | Hutchings | | G08G 1/096791 |
| | | | | 340/435 |
| 2015/0103190 A1* | 4/2015 | Corcoran | | G02B 27/646 |
| | | | | 348/208.2 |
| 2015/0363355 A1* | 12/2015 | Concer | | G06F 15/167 |
| | | | | 709/214 |
| 2015/0365255 A1* | 12/2015 | Gunther | | H04N 21/647 |
| | | | | 370/401 |
| 2016/0077422 A1* | 3/2016 | Wang | | G03B 37/04 |
| | | | | 348/38 |
| 2016/0094809 A1* | 3/2016 | Curiel-Lopez | | B60R 1/00 |
| | | | | 348/148 |
| 2016/0212441 A1* | 7/2016 | Adsumilli | | H04N 19/63 |
| 2016/0314365 A1* | 10/2016 | Poledna | | G06K 9/00805 |

FOREIGN PATENT DOCUMENTS

| | | |
|---|---|---|
| JP | 2008-017029 A | 1/2008 |
| JP | 2008-174075 A | 7/2008 |
| KR | 10-2004-0064966 A | 7/2004 |
| KR | 10-2010-0034076 A | 4/2010 |
| KR | 10-2014-0001740 A | 1/2014 |
| KR | 10-2014-0051737 A | 5/2014 |

* cited by examiner

FIG. 1

| | Octets | Offset |
|---|---|---|
| transportSpecific / messageType | 1 | 0 |
| reserved / versionPTP | 1 | 1 |
| messageLength | 2 | 2 |
| domainNumber | 1 | 4 |
| reserved | 1 | 5 |
| flags | 2 | 6 |
| correctionField | 8 | 8 |
| reserved | 4 | 16 |
| sourcePortIdentity | 10 | 20 |
| sequenceId | 2 | 30 |
| control | 1 | 32 |
| logMessageInterval | 1 | 33 |

FIG. 2

| | Octets | Offset |
|---|---|---|
| header | 34 | 0 |
| reserved | 10 | 34 |
| currentUtcOffset | 2 | 44 |
| reserved | 1 | 46 |
| grandmasterPriority1 | 1 | 47 |
| grandmasterClockQuality | 4 | 48 |
| grandmasterPriority2 | 1 | 52 |
| grandmasterIdentity | 8 | 53 |
| stepsRemoved | 2 | 61 |
| timeSource | 1 | 63 |
| path trace TLV | 4+8N | 64 |

METHOD AND APPARATUS FOR CONTROLLING SYNCHRONIZATION OF CAMERA SHUTTERS IN IN-VEHICLE ETHERNET COMMUNICATION NETWORK

CROSS-REFERENCE TO RELATED APPLICATION

This application claims the benefit of Korean Patent Application No. 10-2015-0009401, filed on Jan. 20, 2015 with Korean Intellectual Property Office, the disclosure of which is hereby incorporated by reference as if fully set forth herein.

BACKGROUND OF THE INVENTION

Field of the Invention

The present invention relates to a method and apparatus for controlling synchronization of camera shutters in an in-vehicle Ethernet communication network and, more particularly, to a method and apparatus for controlling synchronization of camera shutters in an in-vehicle Ethernet network to operate shutters of all cameras inside a vehicle in synchronization based on IEEE 802.1AS.

Discussion of the Related Art

Vehicles on the market today have a variety of electronic controllers (ECUs) for improving convenience and safety of drivers, and are basically configured with an in-vehicle network for communication among these ECUs.

Particularly, as in-vehicle ECUs are gradually increased in number and are capable of interacting with various external devices, overload of an existing vehicle network and increase in costs related to wiring harnesses are caused.

In addition, as customer demands for high-quality audio/video (AV) data and applications using AV data are increased, the need for bandwidth extension is getting more serious.

As such, a large number of vehicle manufacturers consider Ethernet for in-vehicle networking, and some vehicle manufacturers have recently produced Ethernet-based around view monitor (AVM) systems.

An Ethernet network generally includes a plurality of local area networks (LANs) and a plurality of bridges for connection among the LANs.

Ethernet is characterized in that multiple nodes competitively attempt to access a common medium using a Carrier Sense Multiple Access/Collision Detection (CSMA/CD) protocol. However, the CSMA/CD scheme provides the same priority to all traffic, thus making a plurality of nodes transmit traffic thereof through competition, and thus is not appropriate for transmission of multimedia data which is sensitive to propagation time delay, e.g., AV data.

Accordingly, Ethernet uses a technology of synchronizing timings of all network nodes to transmit the multimedia data.

Currently, a standard for audio/video bridging (AVB) is being developed as a transport protocol layer standard such as IEEE 1722 to transmit an AV signal which is sensitive to streaming time. Specifically, the goal of the AVB standard is a quality-guaranteed transmission technology for appropriate transmission of a multimedia stream, e.g., an AV stream, over Ethernet.

As described above, a conventional LAN and, more particularly, a representative technology thereof, Ethernet, have basically used a frame-based packet switching technology and thus could not easily provide an efficient and quality-guaranteed transmission technology. To solve this problem, AVB has been initially developed by IEEE 802.2 under the name of synchronous Ethernet, residential Ethernet, or the like. Currently, IEEE 802.1 is conducting research on a method for implementing a similar technology on a bridge without significantly undermining the paradigm of conventional non-synchronous packet switching.

Basically, AVB of IEEE 802.1 is a technology for enabling synchronous traffic transmission using conventional Ethernet bridges performing packet switching, and a core thereof is to synchronize clocks of bridges within a certain geographic range. If the clocks of the bridges are synchronized, a certain-sized Ethernet frame can be transmitted among the bridges with a certain time interval exactly at a desired time. This basic concept can be expanded to a bridge mesh which can be used as infrastructure for stably delivering synchronous traffic.

For example, IEEE 1588 precision time protocol (PTP) is a time synchronization standard operable over open systems interconnection (OSI) layers, and IEEE 802.1AS is a time synchronization standard supporting only the profile of OSI layer 2, i.e., a data link layer, based on IEEE 1588. If IEEE 802.1AS is applied to a layer 2 device such as a bridge or a switch, an OSI layer 2 time synchronization network may be configured.

A time synchronization method among devices according to IEEE 802.1AS is a method for synchronizing a transmitter and a receiver using a time stamp including time synchronization information. In this method, a grandmaster (GM) for providing a reference time for time synchronization is selected among devices in a network, a local time of the selected grandmaster is transmitted to other devices using an announce message, and thus the other devices use the local time of the grandmaster as a reference time. At this time, the grandmaster transmits the announce message to all other devices to signal information indicating the presence of the grandmaster and a comparative value indicating the suitability as a reference time providing device.

That is, the grandmaster is a top node of the IEEE 802.1AS timing tree and periodically transmits current time information to sub nodes.

IEEE 802.1AS defines a procedure for determining a grandmaster and acquiring time synchronization, a procedure for discovering all devices on a network and controlling access to links using a plurality of control messages, and a procedure for persistently checking link states using an announce message.

However, conventional in-vehicle Ethernet cameras attempt to capture images at the same time based on time synchronization of IEEE 802.1AS, but cannot easily acquire exactly equal-time images due to shutter asynchrony.

SUMMARY OF THE INVENTION

Accordingly, the present invention is directed to a method and apparatus for controlling synchronization of camera shutters in an in-vehicle Ethernet communication network which substantially obviate one or more problems due to limitations and disadvantages of the related art.

An object of the present invention is to provide a method and apparatus for controlling synchronization of camera shutters in an in-vehicle Ethernet communication network.

Another object of the present invention is to provide a method and apparatus for controlling synchronization of camera shutters in an in-vehicle Ethernet communication network to synchronize shutter operations of in-vehicle Ethernet cameras.

A further object of the present invention is to provide a method and apparatus for controlling synchronization of camera shutters in an in-vehicle Ethernet communication network to provide a stable and accurate camera system by adaptively controlling operations of the camera shutters based on IEEE 802.1AS time synchronization.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling synchronization of a camera shutter by a camera controller cooperating with a grandmaster through Ethernet communication includes performing a time synchronization procedure with the grandmaster, reducing a preset pulses per second (PPS) down counter if the time synchronization procedure is successfully completed, and operating the camera shutter if the PPS down counter reaches 0.

The operating of the camera shutter may include operating the camera shutter in a single shot mode to generate one image frame.

The reducing of the PPS down counter may be resumed if the image frame is generated.

The generated image frame may be transmitted to a predetermined controller using an audio/video bridging (AVB) protocol over Ethernet.

The time synchronization procedure may be defined in IEEE 802.1AS.

The method may further include setting a value of the PPS down counter when the camera controller is powered on, and the number of image frames to be captured per second may be determined based on the value of the PPS down counter.

The method may further include switching the camera shutter to a continuous shot mode if the time synchronization procedure is not successfully completed within a prespecified time.

The reducing of the PPS down counter may be performed in the continuous shot mode if the time synchronization procedure is successfully completed.

In another aspect of the present invention, a computer-readable recording medium has recorded thereon a computer program for executing the above method.

In another aspect of the present invention, an apparatus for controlling synchronization of a camera shutter cooperates with a grandmaster through Ethernet and includes an image sensor for generating an image frame, a main controller for setting an internal reference time using reference time information received from the grandmaster, and generating a first signal for operating the camera shutter, based on the internal reference time, and an image signal processor for generating and transmitting a second signal for operating the image sensor, to the image sensor upon receiving the first signal from the main controller, and generating and transmitting a third signal indicating that the image frame captured by the image sensor is present, to the main controller.

A rising edge of the second signal may be triggered at a rising edge of the first signal.

A rising edge of the third signal may be triggered at a falling edge of the second signal.

In another aspect of the present invention, an apparatus for controlling synchronization of a camera shutter cooperates with a grandmaster through Ethernet communication and includes means for performing a time synchronization procedure for setting an internal reference time using reference time information received from the grandmaster, means for reducing a preset pulses per second (PPS) down counter if the time synchronization procedure is successfully completed, and means for operating the camera shutter if the PPS down counter reaches 0.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a table showing the structure of a message header defined in IEEE 802.1AS according to the related art;

FIG. 2 is a table showing the structure of an announce message defined in IEEE 802.1AS according to the related art;

DETAILED DESCRIPTION OF THE INVENTION

Figure 3:
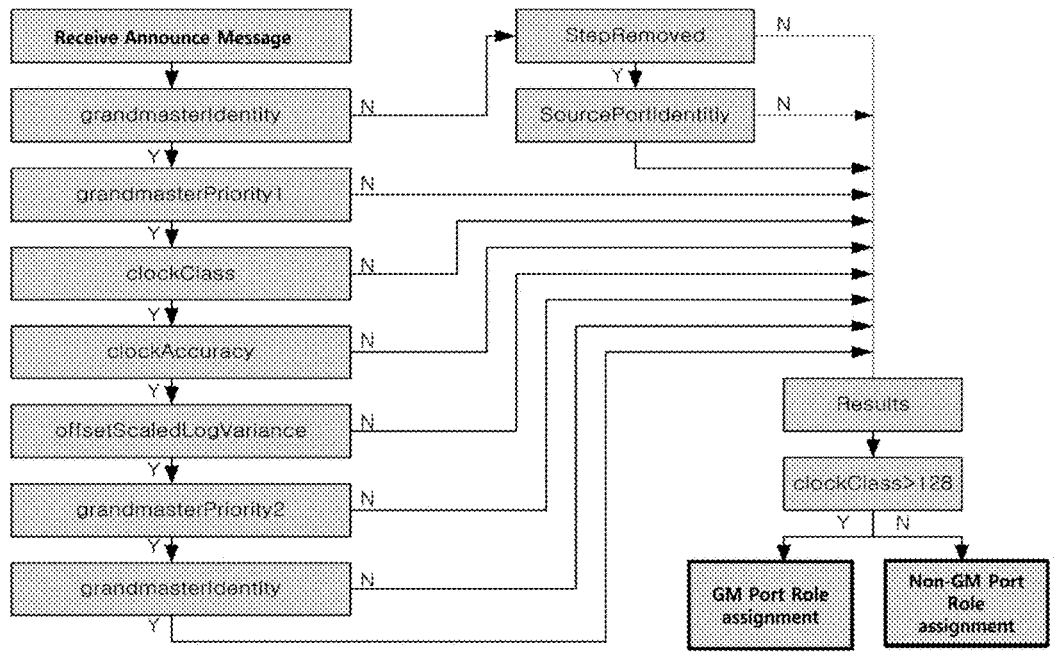
FIG. 3 is a flowchart for describing an announce message comparison procedure and a port assignment method in IEEE 802.1AS according to the related art.

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present invention are described as being integrated into a single one or as being operated as a single one, the present invention is not necessarily limited to such embodiments. According to embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present invention pertains. The computer program may be stored in computer readable media such that the computer program is read and executed by a computer to implement embodiments of the present invention. Computer program storage media may include magnetic recording media, optical recording media, and carrier wave media.

The terms "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not to be interpreted as having ideal or excessively formal meanings.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "combined with", or "coupled to" another element, one element may be "connected to", "combined with", or "coupled to" another element via a further element although one element may be directly connected or coupled to another element.

A time synchronization method defined in IEEE 802.1AS according to the related art is now described in brief with reference to FIGS. 1 to 5.

IEEE 802.1AS defines the header structure of messages used for network time synchronization, the structure of an announce message, a grandmaster (GM) selection method for providing reference time information, a port role assignment method of a switch, etc.

FIG. 1 is a table showing the structure of a message header defined in IEEE 802.1AS according to the related art, and FIG. 2 is a table showing the structure of an announce message defined in IEEE 802.1AS according to the related art.

The announce message may include information necessary to select a grandmaster, e.g., currentUtcOffset, grandmasterPriority1, grandmasterPriority2, grandmasterClockQuality and grandmasterIdentity. Hereinafter, for convenience of explanation, the information necessary to select a grandmaster is called reference time information.

FIG. 3 is a flowchart for describing an announce message comparison procedure and a port assignment method in IEEE 802.1AS according to the related art.

Each eligible device (station) in a network may configure an announce message including reference time information thereof and transmit the announce message to other devices. In this case, a device having the best-quality clock may be selected as a grandmaster. That is, when each device receives announce messages from other devices, the device may compare reference time information thereof to reference time information included in the received announce messages and select a device having the highest priority and accuracy as a grandmaster thereof. If the reference time of the device is more accurate than those of the other devices, the device may determine itself as a grandmaster.

All ports of the device selected as a grandmaster serve to transmit reference time information to other devices. Hereinafter, for convenience of explanation, a port used to transmit reference time information of a grandmaster is defined as a master port. On the other hand, a port of another device connected to the master port and receiving the reference time information of the grandmaster is defined as a slave port.

As illustrated in FIG. 3, when each device receives an announce message, the device may compare reference time information thereof, e.g., grandmasterIdentity, grandmasterPriority1, clockclass, clockAccuracy, offsetScaledLogVariance, grandmasterPriority2, grandmasterIdentity, StepRemoved or SourcePortIdentity, to reference time information of the announce message and determine which device is a grandmaster. For example, if device A determines itself as a grandmaster, device A assigns all ports thereof as master ports. Otherwise, if device A determines another device as a grandmaster, device A assigns all ports thereof as slave ports.

Figure 4:
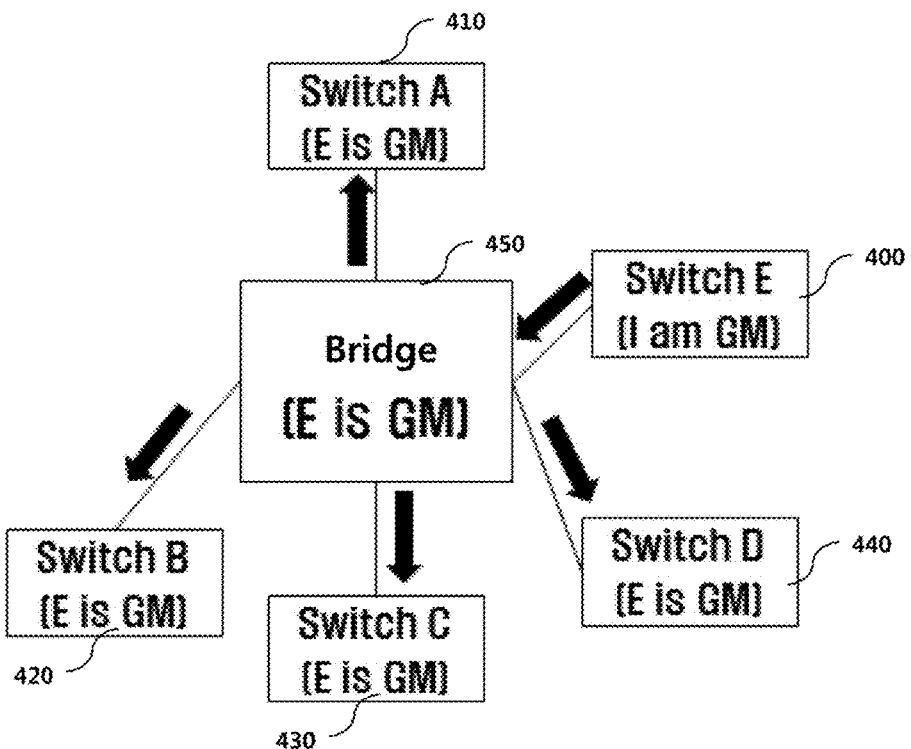
FIG. 4 is a diagram for describing a time synchronization procedure in IEEE 802.1AS according to the related art.

FIG. 4 is a diagram for describing a time synchronization procedure in IEEE 802.1AS according to the related art.

Specifically, FIG. 4 is a diagram for describing a time synchronization procedure in a star topology network structure using a bridge.

In general, the bridge is a network connection device capable of interconnecting two local area networks (LANs), and operates on a data link layer of an open systems interconnection (OSI) reference model.

The bridge may be used, for example, (1) to extend the range and length of a network, (2) to connect a larger number of devices to a network, (3) to reduce a bottleneck situation caused by an excessive number of devices connected to a network, (4) to interconnect networks configured by different physical media (communication lines), and (5) to connect network structures having different topologies such as Ethernet and token ring.

Referring to FIG. 4, it is assumed that a switch E 400 is selected as a grandmaster through an initial time synchronization procedure. The switch E 400 may periodically generate an announce message including reference time information thereof and transmit the announce message to a bridge 450. Subsequently, the bridge 450 may deliver the received announce message to a switch A 410, a switch B 420, a switch C 430 and a switch D 440.

Alternatively, the bridge 450 may analyze time information included in received announce messages, identify a switch providing the most accurate time information, and control only the announce message received from the identified switch to be delivered to slave nodes.

Figure 5:
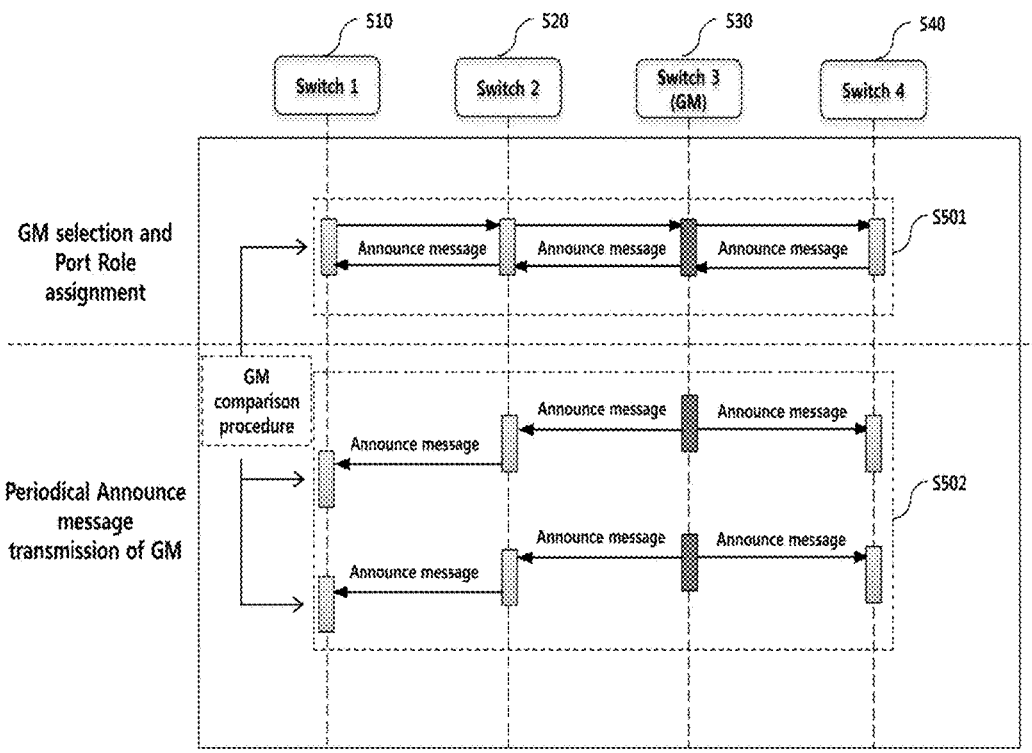
FIG. 5 is a flowchart for describing a grandmaster selection and announce message transmission procedure according to the related art.

FIG. 5 is a flowchart for describing a grandmaster selection and announce message transmission procedure according to the related art.

Referring to FIG. 5, each of a switch 1 510 to a switch 4 540 transmits an announce message to switches connected thereto, selects a grandmaster through a reference time information comparison procedure, and assigns the role of ports thereof based on the selection result (S501). As illustrated in FIG. 5, it is assumed that the switch 3 530 is selected as a grandmaster.

After that, the switch 3 530 generates an announce message periodically (e.g., in a cycle of 1 sec.) and transmits the announce message through master ports to the switch 2 520 and the switch 4 540, and the switch 2 520 delivers the received announce message through a slave port thereof to the switch 1 510 (S502). That is, a device selected as a grandmaster may notify presence of the grandmaster and superiority of a reference time thereof to other devices using an announce message.

Figure 6:
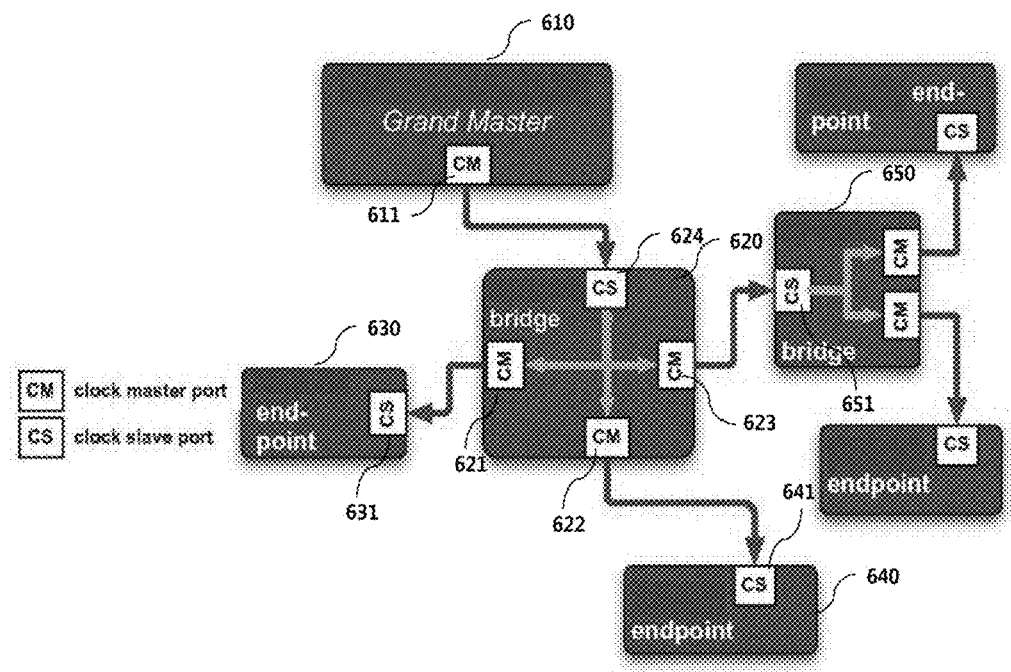
FIG. 6 is a diagram for describing a time synchronization method among nodes based on IEEE 802.1AS.

FIG. 6 is a diagram for describing a time synchronization method among nodes based on IEEE 802.1AS.

Referring to FIG. 6, a grandmaster 610, which is an 802.1AS device, transmits a sync message and a correcting follow up message (hereinafter simply referred to as a follow up message) through a clock master port 611 to a clock slave port 624 of a bridge 620, which is another 802.1AS device.

Subsequently, the bridge 620 transmits time correction information based on cable and bridge delays through clock master ports 621, 622 and 623 to clock slave ports 631, 641 and 651 of other 802.1AS devices (end-points 630 and 640 and a bridge 650).

Here, the time correction information may include link delay information, propagation time delay information, neighbor rate ratio information, correction field information, etc.

Figure 7:
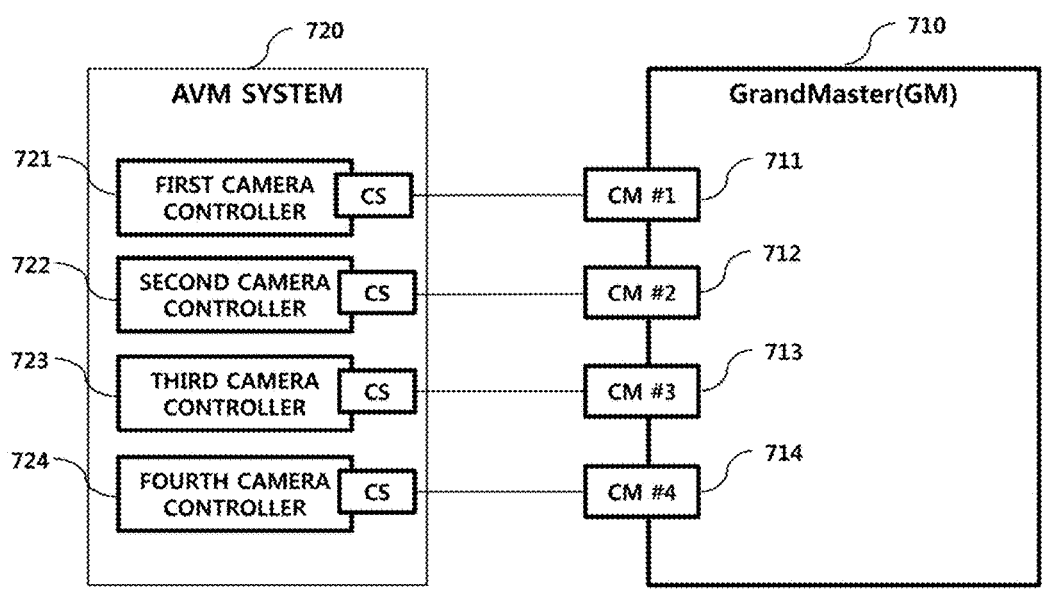
FIG. 7 is a block diagram for describing the configuration of a camera shutter time synchronization system according to an embodiment of the present invention.

FIG. 7 is a block diagram for describing the configuration of an Ethernet camera shutter time synchronization system according to an embodiment of the present invention.

Referring to FIG. 7, the camera shutter time synchronization system may be configured to mainly include a grandmaster 710 for providing reference time information based on IEEE 802.1AS, and an around view monitor (AVM) system 720 for acquiring system synchronization by receiving the reference time information from the grandmaster 710. Here, first to fourth camera controllers 721 to 724 included in the AVM system 720 operate as slave nodes based on IEEE 802.1AS.

Although the AVM system 720 includes four camera controllers (e.g., 721 to 724) to capture peripheral images in the following description, four merely corresponds to an embodiment and it should be noted that a greater or smaller number of camera controllers may be included according to another embodiment of the present invention.

The grandmaster 710 transmits the reference time information through first to fourth clock master ports 711 to 714 to clock slave ports of the first to fourth camera controllers 721 to 724.

When powered on, each of the first to fourth camera controllers 721 to 724 cooperates with the grandmaster 710 to perform a time synchronization procedure based on IEEE 802.1AS. When time synchronization is not acquired, the first to fourth camera controllers 721 to 724 automatically start cameras to capture peripheral images.

However, if images are captured when time synchronization is not acquired, camera controllers use different reference times and thus may not easily capture images at the same time.

On the other hand, if time synchronization is acquired based on IEEE 802.1AS, the first to fourth camera controllers 721 to 724 do not automatically start cameras and may synchronize operations of camera shutters based on a predefined shutter control algorithm. Accordingly, images captured by the first to fourth camera controllers 721 to 724 may be controlled to be equal-time images.

Particularly, an image recognition system using multiple channels, e.g., the AVM system 720, needs to simultaneously receive and process equal-time images from the multiple channels for accurate image recognition. In this regard, shutters of all cameras should simultaneously operate at an accurate time.

Figure 8:
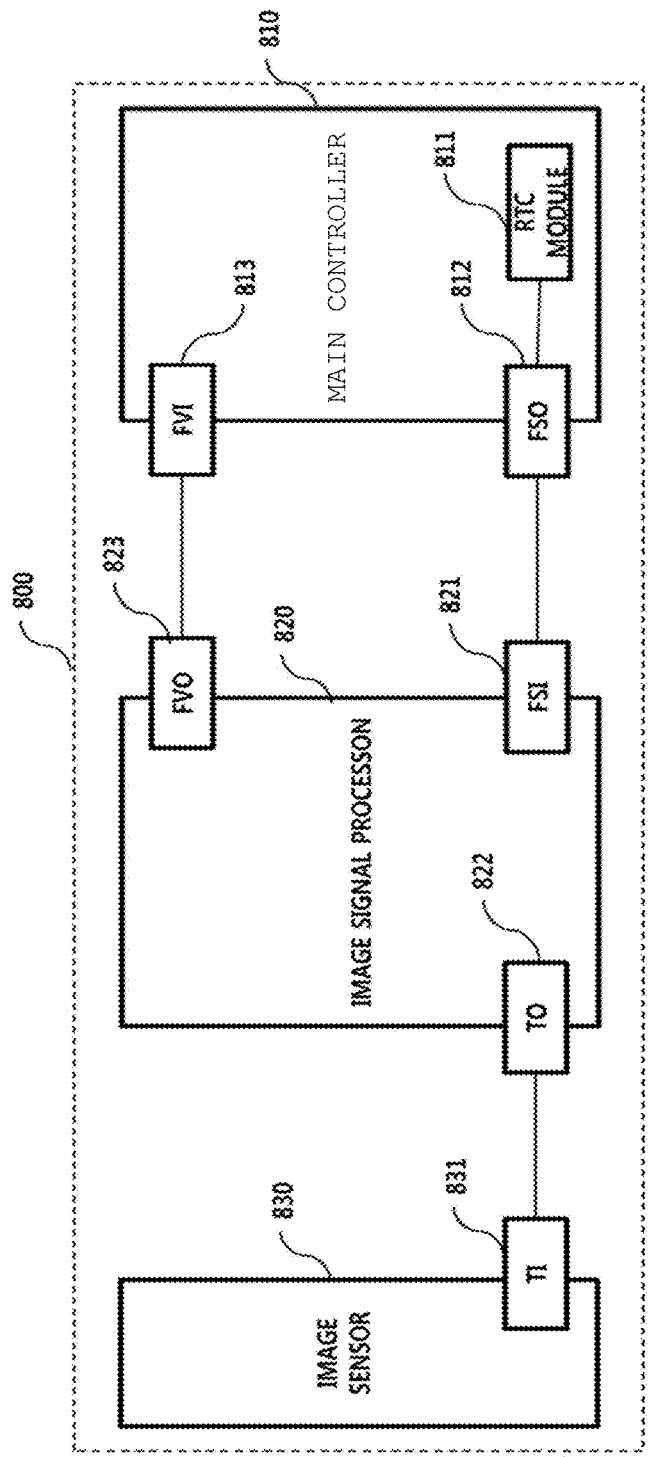
FIG. 8 is a block diagram for describing the hardware configuration of a camera controller according to an embodiment of the present invention.

FIG. 8 is a block diagram for describing the hardware configuration of a camera controller 800 according to an embodiment of the present invention.

Referring to FIG. 8, the camera controller 800 may be configured to include a main controller (MCU) 810, an image signal processor (ISP) 820 and an image sensor 830.

When an internal reference time is set based on reference time information of an announce message received through a clock slave port, a real time clock (RTC) module 811 of the main controller 810 generates a pulse signal (hereinafter referred to as a FRAME_SYNC signal) for camera shutter control in a certain cycle using an internal clock generator. The generated FRAME_SYNC signal is input through a FRAME_SYNC OUT (FSO) pin 812 to a FRAME_SYNC IN (FSI) pin 821 of the image signal processor 820. Here, the cycle of pulses may be defined in pulses per second (PPS) through user menu settings.

The image signal processor 820 generates a TRIGGER_OUT signal to be output through a TRIGGER_OUT (TO) pin 822, based on the FRAME_SYNC signal received through the FSI pin 821. In this case, the generated TRIGGER_OUT signal is input through the TO pin 822 to a TRIGGER_IN (TI) pin 831 of the image sensor 830.

The image sensor 830 captures an image focused by a camera lens based on the TRIGGER_OUT signal received through the TI pin 831.

In addition, the image signal processor 820 generates a FRAME_VALID_OUT signal to be output through a FRAME_VALID_OUT (FVO) pin 823, based on the generated TRIGGER_OUT signal. The generated FRAME_VALID_OUT signal is input through the FVO pin 823 of the image signal processor 820 to a FRAME_VALID_IN (FVI) pin 813 of the main controller 810. The main controller 810 may recognize that an image captured by the image sensor 830, i.e., a valid frame, is present, based on the FRAME_VALID_OUT signal received through the FVI pin 813.

Figure 9:
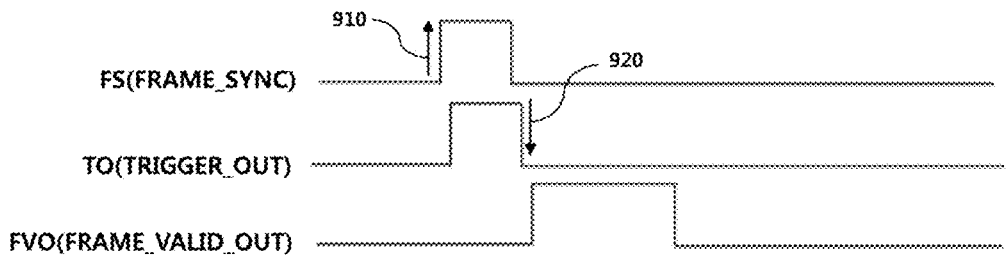
FIG. 9 is a signal timing diagram for describing operation of the camera controller in a single shot mode of an image signal processor according to an embodiment of the present invention.

FIG. 9 is a signal timing diagram for describing operation of the camera controller 800 in a single shot mode of the image signal processor 820 according to an embodiment of the present invention.

A description is now given of timing for generating a signal for operating a camera shutter by the image signal processor 820, with reference to FIG. 9.

If time synchronization is acquired based on IEEE802.1AS, the image signal processor 820 is switched to the single shot mode.

In the single shot mode, the image signal processor 820 triggers the TRIGGER_OUT signal to a rising edge at a rising edge 910 of the FRAME_SYNC signal received through the FSI pin 821 of the image signal processor 820 controller. After that, the image signal processor 820 triggers the FRAME_VALID_OUT signal to a rising edge at a falling edge 920 of the TRIGGER_OUT signal.

In this case, when the rising edge of the TRIGGER_OUT signal is triggered, image capture of the image sensor 830 is started. When the rising edge of the FRAME_VALID_OUT signal is triggered, the main controller 810 may recognize that an image captured by the image sensor 830 is present, and thus acquire the image captured by the image sensor 830. The image acquired by the main controller 810 is transmitted to a corresponding controller using an Ethernet based AVB protocol.

Figure 10:
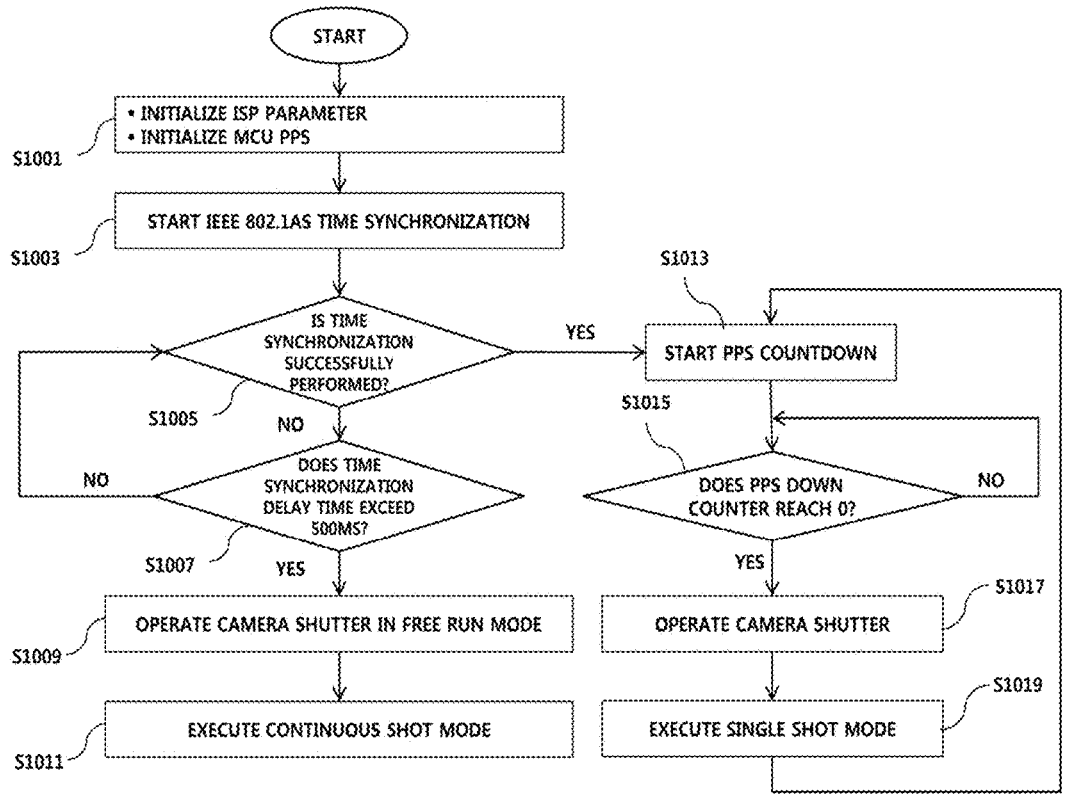
FIG. 10 is a flowchart for describing a camera shutter time synchronization method in an in-vehicle Ethernet communication network according to an embodiment of the present invention.

FIG. 10 is a flowchart for describing a camera shutter time synchronization method in an in-vehicle Ethernet communication network according to an embodiment of the present invention.

When cameras of the AVM system 720 are powered on, a parameter setting value of the image signal processor 820 and a PPS value of the main controller 810 may be initialized (S1001). In this case, the main controller 810 may switch an operation mode of the image signal processor 820 from an auto start mode to a manual start mode. In addition, the main controller 810 may set a camera shutter operation cycle, i.e., a PPS down counter, to 33 ms. That is, the main controller 810 may set an Ethernet camera to capture 30 frames per second.

Accordingly, in the present invention, the number of image frames to be captured per second may be determined based on a PPS down counter value set in a single shot mode.

After that, the main controller 810 starts a time synchronization procedure defined in IEEE 802.1AS and determines whether time synchronization is successfully performed (S1003 and S1005). In this case, when the time synchronization procedure is started, a time synchronization delay time may be calculated.

Upon determining that time synchronization is not successfully performed, the main controller 810 determines whether the time synchronization delay time exceeds a pre-specified time, e.g., 500 ms (S1007).

Upon determining that the time synchronization delay time exceeds the pre-specified time, the main controller 810 may switch an operation mode of the image signal processor 820 from a manual start mode to a free run mode and start to operate the camera shutter (S1009).

In the free run mode, the main controller 810 controls the camera shutter to operate in a continuous shot mode (S1011). Here, the continuous shot mode refers to a camera shot mode in which the image sensor 830 continuously captures images without acquiring shutter synchronization among camera controllers.

The operation mode is switched to the free run mode to prevent operation of the whole system from being influenced by delay of time synchronization during AVM system operation. That is, if time synchronization is not acquired for a pre-specified time, e.g., 500 ms, after a time synchronization procedure based on IEEE 802.1AS is started, the main controller 810 according to the present invention may be controlled to capture images without synchronization of the camera shutter similarly to camera operation of a conventional AVM system.

Upon determining that time synchronization is successfully performed in step 1005, the main controller 810 starts a PPS countdown procedure for reducing a PPS down counter value set to 33 ms (S1013).

When the PPS down counter value reaches 0, the main controller 810 generates a FRAME_SYNC signal for operating the camera shutter to execute the single shot mode (S1015 and S1017). That is, the main controller 810 may control the camera shutter to generate one image frame by operating the same in the single shot mode (S1019).

After that, the main controller 810 returns to step 1013 and resumes the PPS countdown procedure. Accordingly, if time synchronization is acquired, the camera controller may generate one image frame every 33 ms.

In addition, if time synchronization is acquired in the continuous shot mode, the main controller 810 may be switched to the single shot mode to control the camera shutter to generate a synchronized image frame.

As is apparent from the above description, the method and apparatus according to the present invention have the following effects.

First, the present invention may provide a method and apparatus for controlling synchronization of camera shutters in an in-vehicle Ethernet communication network.

Second, the present invention may provide a method and apparatus for controlling synchronization of camera shutters in an in-vehicle Ethernet communication network to acquire equal-time images from a plurality of in-vehicle Ethernet cameras by synchronizing shutter operations of the cameras.

Third, the present invention may provide a method and apparatus for controlling synchronization of camera shutters in an in-vehicle Ethernet communication network to provide a stable and accurate camera system by adaptively controlling operations of the camera shutters based on IEEE 802.1AS time synchronization.

Fourth, the present invention may provide synchronization of camera shutters and thus is applicable to an image recognition application, e.g., an advanced driver assistance system (ADAS), which requires image frames simultaneously captured at the same time but from a variety of angles.

It will be appreciated by persons skilled in the art that the effects that could be achieved through the present invention are not limited to what has been particularly described hereinabove and other advantages of the present invention will be more clearly understood from the above detailed description.

Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling synchronization of camera shutters of a plurality of cameras by a camera controller communicatively connected to the plurality of cameras and cooperating with a grandmaster through Ethernet communication, the method comprising steps of:
   performing a time synchronization procedure with the grandmaster between the camera shutters, each included in the plurality of cameras mounted in a vehicle;
   reducing a preset pulses per second (PPS) down counter if the time synchronization procedure is completed;
   operating each of the camera shutters when the PPS down counter reaches 0; and
   switching each of the camera shutters to a continuous shot mode when the time synchronization procedure is not completed within a pre-specified time,
   wherein the step of operating each of the camera shutters comprises operating a camera shutter in a single shot mode to generate an image frame for each of the plurality of cameras when the time synchronization procedure is completed, and
   wherein the step of reducing the PPS down counter is restarted when the image frame is generated.

2. The method according to claim 1, wherein the generated image frame is transmitted to a predetermined controller using an audio/video bridging (AVB) protocol over Ethernet.

3. The method according to claim 1, wherein the time synchronization procedure is defined in IEEE 802.1AS.

4. The method according to claim 1, further comprising setting a value of the PPS down counter when the camera controller is powered on,
wherein a number of image frames to be captured per second is determined based on the value of the PPS down counter.

5. An apparatus for controlling synchronization of camera shutters of a plurality of cameras, the apparatus cooperating with a grandmaster through Ethernet communication and comprising a controller communicatively connected to the plurality of cameras and configured to:
perform a time synchronization procedure for setting an internal reference time using reference time information received from the grandmaster between the camera shutters, each included in the plurality of cameras mounted in a vehicle;
reduce a preset pulses per second (PPS) down counter when the time synchronization procedure is completed;
operate each of the camera shutters when the PPS down counter reaches 0; and
switch each of the camera shutters to a continuous shot mode when the time synchronization procedure is not completed within a pre-specified time,
wherein each of the camera shutters operates in a single shot mode to generate an image frame when the time synchronization procedure is completed, and
wherein the PPS down counter restarts when the image frame is generated.

6. The apparatus according to claim 5, wherein the generated image frame is transmitted to a predetermined controller using an audio/video bridging (AVB) protocol over Ethernet.

7. The apparatus according to claim 5, wherein the time synchronization procedure is defined in IEEE 802.1AS.

8. The apparatus according to claim 5, wherein a value of the PPS down counter is set when the apparatus is powered on, and
wherein a number of image frames to be captured per second is determined based on the set value of the PPS down counter.

* * * * *